(12) United States Patent
Feagans

(10) Patent No.: US 6,360,281 B1
(45) Date of Patent: Mar. 19, 2002

(54) SYSTEM AND METHOD FOR COMMUNICATING WITH A SERIAL COMMUNICATIONS DEVICE USING MULTIPLE VIRTUAL PORTS

(75) Inventor: Raymond J. Feagans, Nevada City, CA (US)

(73) Assignee: 3Com Corporation, Santa Clara, CA (US)

(*) Notice: Subject to any disclaimer, the term of this patent is extended or adjusted under 35 U.S.C. 154(b) by 0 days.

(21) Appl. No.: 09/093,837

(22) Filed: May 29, 1998

(51) Int. Cl.[7] .............................................. G06F 13/00
(52) U.S. Cl. ................. 710/1; 710/7; 710/20; 370/235
(58) Field of Search ................ 710/1, 64, 72, 710/20.21, 131, 240, 7, 20, 21, 36, 268, 31, 33; 370/235, 462

(56) References Cited

U.S. PATENT DOCUMENTS

| | | | | |
|---|---|---|---|---|
| 5,471,468 A | * | 11/1995 | Sandin et al. ................. | 370/60 |
| 5,495,570 A | * | 2/1996 | Heugel et al. ................. | 714/11 |
| 5,495,619 A | * | 2/1996 | May et al. ................. | 395/800 |
| 5,740,235 A | * | 4/1998 | Lester et al. ................. | 379/170 |
| 5,790,895 A | * | 8/1998 | Krontz et al. ................. | 710/64 |
| 5,884,103 A | * | 3/1999 | Terho et al. ................. | 710/72 |
| 5,963,620 A | * | 10/1999 | Frankel et al. ................. | 379/93.05 |
| 6,185,188 B1 | * | 2/2001 | Hasegawa ................. | 370/235 |

OTHER PUBLICATIONS

"Unimodem Diagnostics Command Draft Reference Specification", Microsoft Corporation.

* cited by examiner

Primary Examiner—Thomas Lee
Assistant Examiner—Rijue Mai
(74) Attorney, Agent, or Firm—McDonnell Boehnen Hulbert & Berghoff

(57) ABSTRACT

A system and method for communicating with a serial communications device using multiple virtual ports. The multiple virtual ports are mapped to device names using a port router. The virtual ports are accessed to provide a communications port, or to provide a command/status port for accessing status and performance information about the communications device. The virtual ports may be used to establish a communications connection and, concurrently, to run a second application that monitors the communications speed. The communications speed may be displayed to the user in real-time.

30 Claims, 6 Drawing Sheets

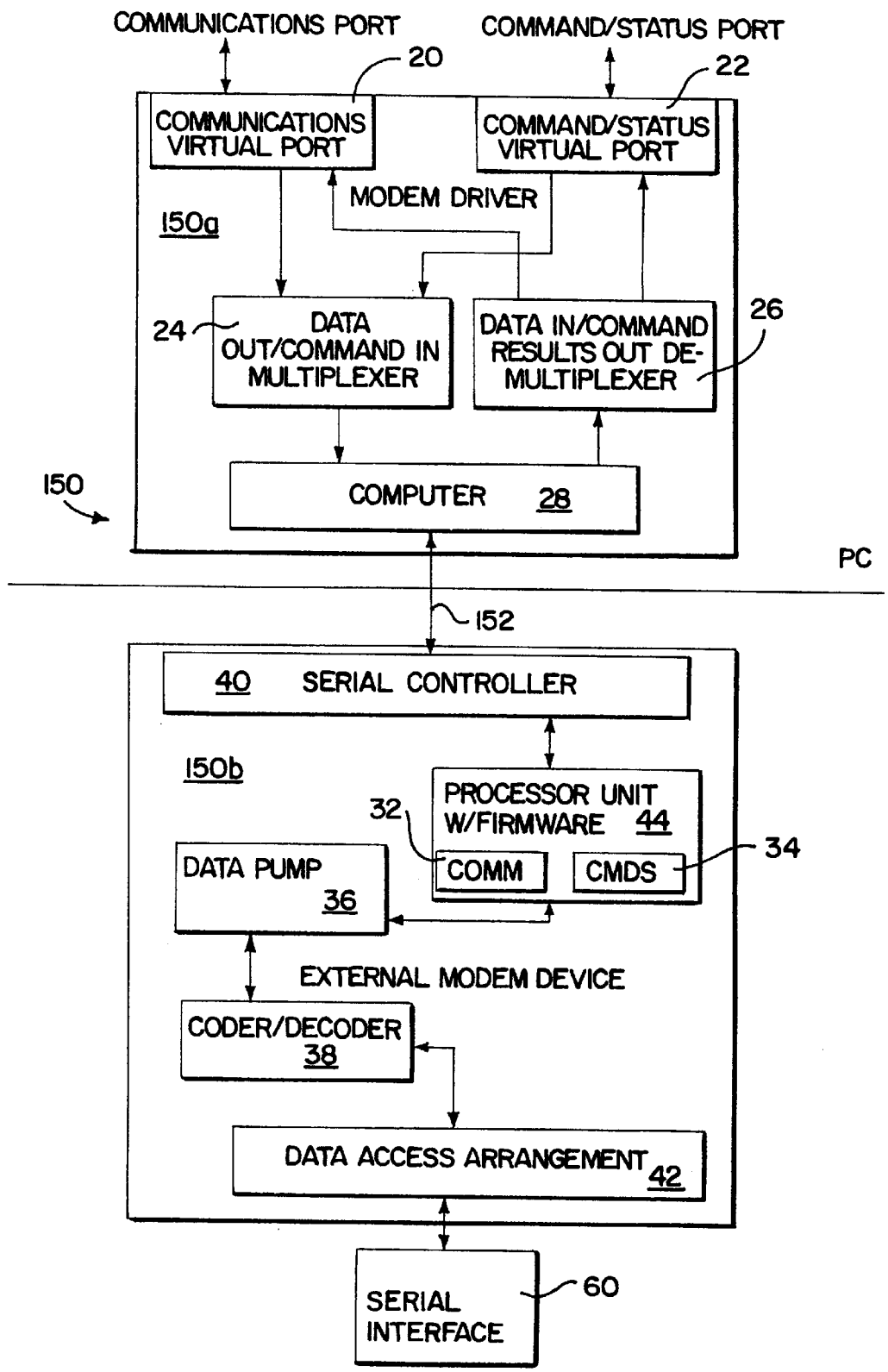

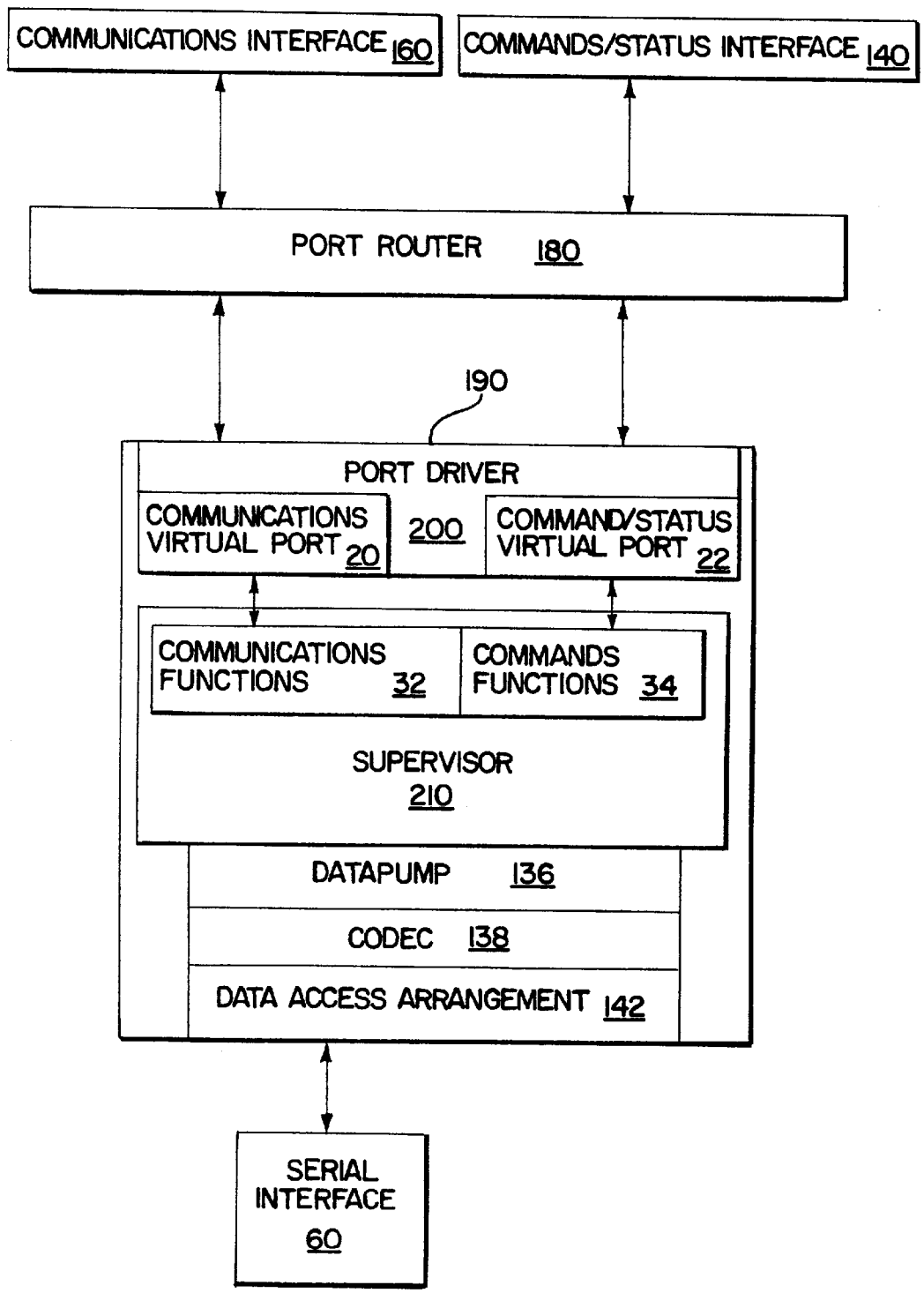

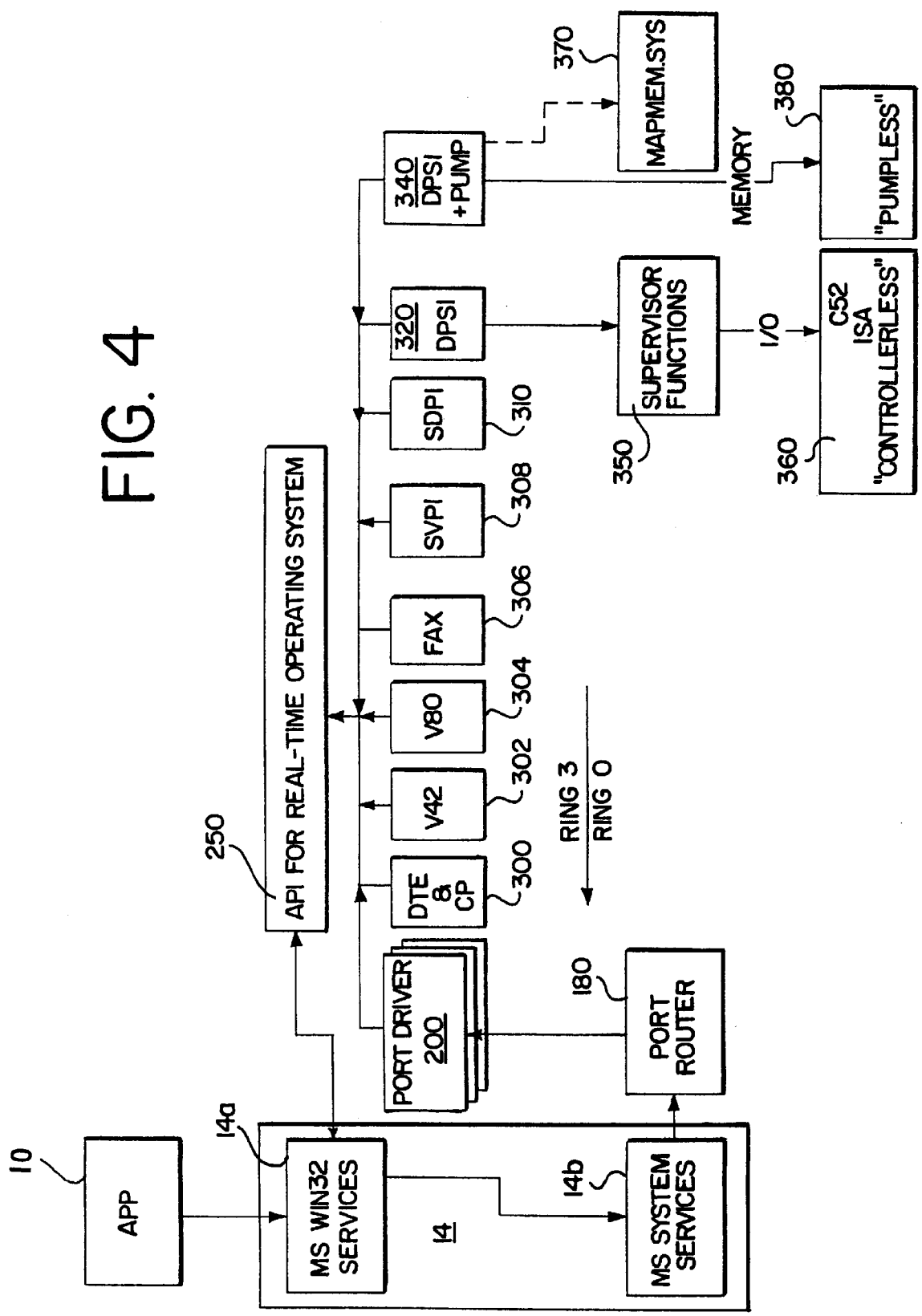

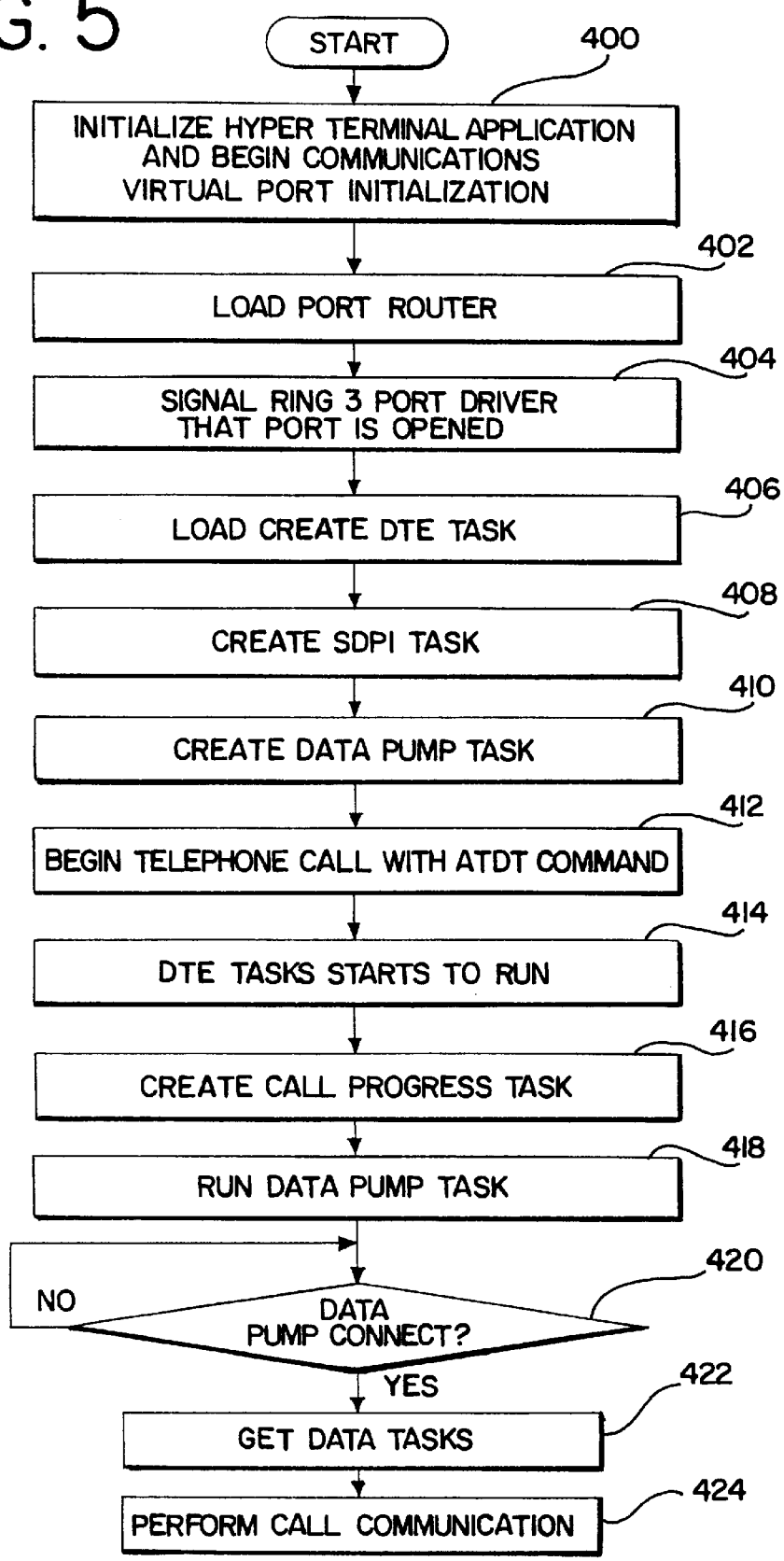

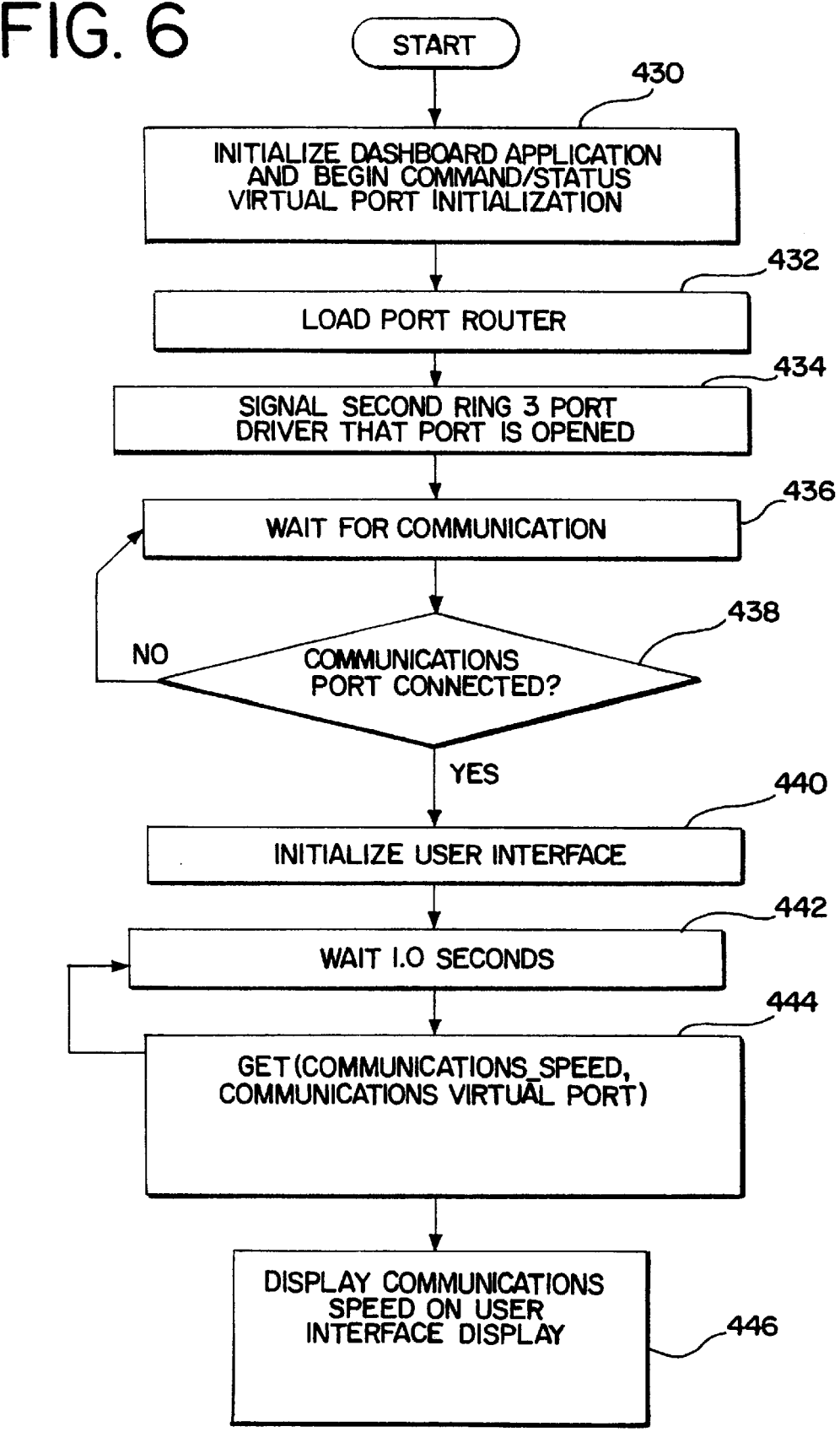

SYSTEM AND METHOD FOR COMMUNICATING WITH A SERIAL COMMUNICATIONS DEVICE USING MULTIPLE VIRTUAL PORTS

BACKGROUND OF THE INVENTION

A. Field of the Invention

The present invention relates to the field of data communications and, more particularly to the field of data communications using modems.

B. Background of the Invention

Serial port modems in personal computers permit users to connect to a growing variety of network services on a telephone line. Modems have evolved to the extent that users may communicate at speeds that are too high for some phone lines.

Some modems adapt to changing line conditions by adjusting the connect speed to ensure reliable data transport. The connect speed at which a modem is communicating is therefore, not precisely what the user may expect. In addition, the speed of data transmission may be different from the speed of data reception. Some users may find it useful to know the exact connect speeds in both directions. Diagnostic tools may also be developed that provide useful information about a modem's performance. The usefulness of the tools depends however, on the ability to provide it with information about the performance of a modem while the modem is communicating.

One problem with obtaining diagnostic information (e.g. the true connect speed) about the performance of the modem while it is communicating is that modems do not typically execute commands to give status information while communicating. Modems are typically online communicating data or offline executing commands. Modems can be put into an online command mode.

In one diagnostic tool, a user at a computer station connects to a bulletin board service (BBS) that provides a way of testing the telephone line to determine if it is capable of communicating at speeds of 56 kbaud. The tool performs modem commands to make the determination by sending "+++" to the modem to interrupt the data mode online state and to take the modem to an online command mode. The "+++" string is typically required to be sent at the same cadence and speed of human typing. In the online command mode, the modem will receive and execute commands. An "AT16" command is sent to the modem to cause it to transmit an information screen. The tool parses the screen data for the desired information. When the tool is finished, it sends an "ATO" command to the modem to cause it to go back to data mode on-line. As the example illustrates, it was necessary for the modem to be put in a command mode while on-line to retrieve status information. During the command mode, the modem was not communicating data.

In addition, the "+++" command takes approximately ½ second to complete because it has to be executed at the speed and cadence of human typing. If the results of obtaining information were to be displayed on the screen, another second of time would elapse. The 1½ seconds of time to obtain the information makes it difficult to provide the results on the screen in real-time and stops all useful data transfer.

It would be desirable to retrieve status information or to issue modem commands without having to cause the modem to go into a command mode that interrupts data communication.

It would further desirable to be able to obtain status information about a modem for display on a computer screen in real-time.

SUMMARY OF THE INVENTION

In view of the above, a system is provided for communicating with a serial communications device. The system includes a serial device interface for communicating with an application. The serial device interface includes a plurality of virtual ports. At least one of the virtual ports is configurable as a communications virtual port. At least one of the virtual ports is configurable, concurrently with the at least one communications virtual port, as a status virtual port. A serial line interface is connected to a communications medium. A serial communications processor is included for managing serial data streams between the serial line interface and the communications virtual ports. The serial communications processor includes a commands processor for executing commands received at the at least one status virtual port.

In a further aspect of the present invention, the serial device interface includes a command multiplexer for embedding commands in the serial data stream. The serial communications processor separates the embedded commands from the serial data stream. The serial communications processor is multiplexes a results string with an input data stream in response to the embedded commands.

In another aspect of the present invention, a port router is included to map device names to the virtual ports. The virtual ports include a port driver for sending commands to the serial communications processor.

A method is also provided for communicating with a serial communications device connected to a serial interface line. A communications connection is initiated by opening a first virtual port in the serial communications device and connecting the first virtual port to a destination station over the serial interface line. The first virtual port is used for communicating a data stream between the serial communications device and the destination station. A second virtual port is opened in the serial communications device. Commands are sent to the second virtual port and processed, such that the commands are processed without an interruption in the communication of the data stream at the first virtual port.

These and many other advantages and features of the invention will become more apparent from the following detailed description of presently preferred embodiments of the invention.

BRIEF DESCRIPTION OF THE DRAWINGS

Presently preferred embodiments of the invention are described below in conjunction with the appended drawing figures, wherein like reference numerals refer to like elements in the various figures, and wherein:

FIG. 2 is a block diagram of an externally connected modem service used in the communication system in FIG. 1;

FIG. 3 is a block diagram of embodiment using an internal modem device used in the communication system in FIG. 1;

FIG. 4 is a block diagram of a preferred embodiment of the present invention;

FIG. 5 is a flowchart of a method of communicating with an application using an example of the communication system in FIG. 1; and FIG. 6 is a flowchart of a method of obtaining status information using the communication system in FIG. 1.

DETAILED DESCRIPTION OF THE PREFERRED EMBODIMENT

Figure 1:
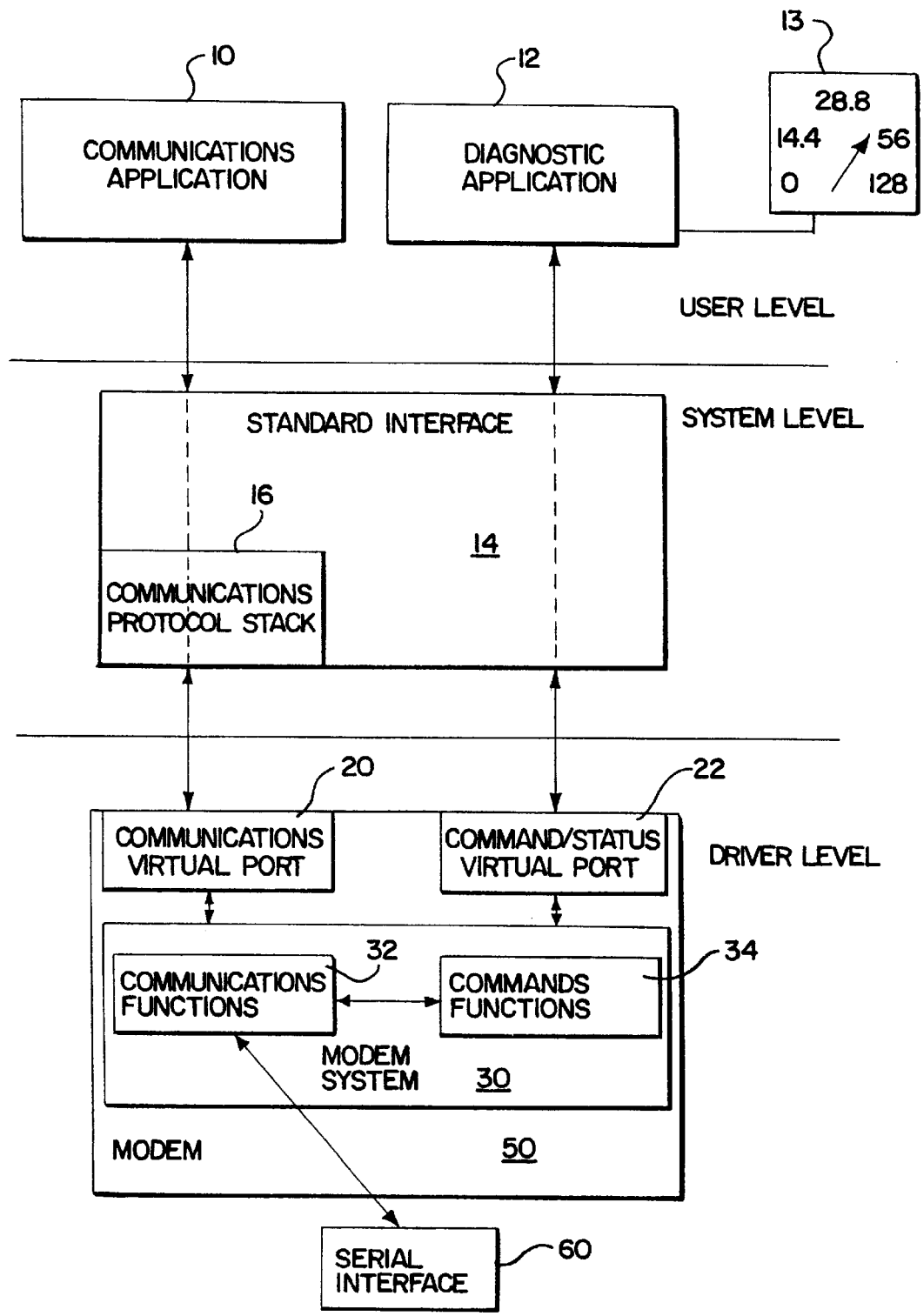
FIG. 1 is a block diagram of a communication system of the type in which the present invention finds particular use.

The description below refers to communications standards V.42, V.80, V.34 and V.90. These standards are published under the following titles: V.42, *Error-correcting procedures for DCEs using asynchronous-to-synchronous conversion*; V.80, *In-band DCE control and synchronous data modes for asynchronous DTE*; V.34, *A modem operating at data signally rates of up to 33 600 bit/s for use on the general switched telephone network and on leased point-to-point 2-wire telephone-type circuits*; and V.90, 56K Modems. They may be obtained from the International Telecommunications Union (ITU).

FIG. 1 is a block diagram of a communications system of the type in which the present invention finds advantageous use. The communication system in FIG. 1 includes a communications application 10 and a diagnostics application 12 at a user level in a typical personal computer. The communications application 10 and diagnostic application 12 communicate with driver level components through a standard interface 14 at the system level. The standard level 14 may include a communications protocol stack 16 for performing standard communications functions.

A modem 50 at the driver level is used to provide communications functions for applications, such as communications application 10 and the diagnostic application 12, which operate at the user level. The modem 50 includes a serial device interface, which may include a communications virtual port 20 and the command/status virtual port 22 as shown in the example in FIG. 1. The serial device interface provides the applications at the user level with access to the communications resources available from the modem 50. The communications virtual port 20 may be used to provide data communications functions, which include the transmission and reception of data streams. The command/status virtual port 22 may be used to provide access to command and status information about the modem 50 and any communications links that may be in process at the communications virtual port 20.

The modem 50 includes a serial communications processor 30, which includes communications functions 32 and commands functions 34. The serial communications processor 30 manages communications at a serial interface 60 by controlling the reception and transmission of data streams using the communications functions 32 and by providing information and resource control using commands functions 34. Table 1 lists examples of the types of commands that may be processed by the commands functions 34.

Table 1—Examples of Modem Commands
1. Show TX/RX byte count
2. Display TX/RX throughput (includes compression)
3. Provide the reason why the application failed to open the COM port
4. Animate auto answer On/Off LED
5. Provide remote modem identification and capabilities
6. List local modem features supported
7. Display modem firmware version
8. Display data pump type
9. Answer whether modem is upgradable to next standard
10. Indicate ARQ TX/RX errors
11. Illustrate line quality (SNR)
12. Provide connection modulation type
13. Indicate retrain count
14. Display currently configured fax class and fax classes supported.
15. Display time the device spent waiting for information from the remote side of the connection
16. Indicate whether modem has reached V.90 speeds
17. Provide active networking protocol (PPP, TCP/IP, SLIP, etc.)
18. List current & mean TX/RX data rate
19. List current & mean TX/RX compression ratio
20. Indicate power save mode (sleep, deep sleep, full power)
21. Display symbol rate
22. Display TX/RX power levels
23. Provide current error protocol type
24. Provide current compression Type
25. List current ARQ (Acknowledge/Request protocol) Type
26. Provide eye pattern data The serial interface 60 may include any connections system for connecting to any suitable serial communications medium. Modems typically are connected to the public switched telephone network (PSTN).

One advantage of the modem 50 illustrated in FIG. 1 is that multiple virtual ports may be used simultaneously to provide access to communications and commands functions. For example, the communications application 10 may include a web browser that communicates via the communications protocol stack 16 to the communications virtual port 20. The communications protocol stack 16 includes a set of protocol drivers, each of which may implement well-known network interface protocols such as, SNMP, TELNET, FTP, SMTP, PPP, SLIP, etc. The protocol drivers interface with one another to provide a communications path between the user level and the driver level.

While the network session at the communications virtual port 20 is in process, the diagnostic application 12 may access information about the performance of the modem during the network session without interrupting or substantially affecting the data communications process at the communications virtual port 20.

For example, the diagnostic application 12 may provide a user with a dashboard-like interface 13 that may illustrate, for example, the current speed of modem communication. The diagnostic communication 12 may invoke modem commands via the command status virtual port 22 using driver and function calls provided by the standard interface 14. A command requesting the current speed of a modem may be received at the command/status virtual port 22 and executed by the serial communications processor 30 using the commands functions 34 without interrupting any of the communications being performed at the communications virtual port 20. Furthermore, the command is requested and executed, and the results received in real-time. The speed of the modem connection may be displayed on the computer screen in real-time.

Another advantage of the modem 50 shown in FIG. 1 is that multiple ports may be defined using the standard interface 14 to communicate with a single modem device 50.

FIG. 2 is a block diagram of a modem 150 and may be used in the communications system shown in FIG. 1. The modem 150 in FIG. 2 includes multiple virtual ports according to preferred embodiments of the present invention using a modem driver 150*a* and an external modem device 150*b*. In the modem driver 150*a*, the communications virtual port 20 and the command/status virtual port 22 are connected to a multiplexer for data out/command in 24 and to a de-multiplexer data in/command results out 26. The multiplexer 24 and the de-multiplexer 26 are connected to the computer I/O 28. The computer I/O 28 is connected to the external modem device 150*b* using a data line 152. The data line 152 connects the computer port at the computer I/O 28 to the external modem device 150 using well-known connection systems.

The external modem device 150*b* includes a serial controller 40, a processor unit with firmware 44, a data pump 36, a coder/decoder 38, and a data access arrangement 42. The processor unit with firmware 44 includes the commands functions 34 and the communications functions 32.

The serial controller 40 passes data between the processor unit with firmware 44 and the modem driver 150*a* in the PC. The serial controller 40 may include standard serial chips that can support data rates of up to 115 kbps. The serial controller 40 may include an intelligent buffer management system that can provide communication speeds of up to 400 kbps or higher.

The processor unit with firmware 44 includes a microcontroller, RAM and erasable, programmable memory (EPROM), the fin-ware and the processor unit with firmware 44 may include a control program using EPROM flash memory that enables a user to upgrade the program. The processor unit with firmware performs supervisor functions such as data compression, error correction, command processing (e.g., AT command processing) and test functions. These supervisor functions may be included in the communications functions 32 and the commands functions 34.

The data pump 36 performs processing that converts digital signals to analog signals and vice versa. The data pump 36 may include a digital signal processor (DSP), DSP code and an interface to the coder/decoder 38.

The coder/decoder 38 translates between a digitized version of the analog wave form provided by the DSP and a true analog signal which is provided by or sent to the data access arrangement 42. The data access arrangement 42 is an interface to the analog telephone network at the serial interface 60. The data access arrangement 42 performs functions such as ring detect, pulse dialing, and off-hook relay.

The modem driver 150*a* may receive communications commands from the communications applications 10 at the communications virtual port 20 and command/status commands at the command/status virtual port 22. The data out/command in multiplexer 24 receives commands from the command/status virtual port 22 and embeds the commands in the communications string received at the communications virtual port 20 using a DLE command.

For example, a transmit string may include characters such as, ABCDEFG. A command such as, "CMD_BLK_ERROR_STATUS" may be multiplexed into the string by proceeding it with a DLE command. The string would then be: ABC DLE CMD_BLK_ERROR_STATUS DEFG. The DLE and the CMD-BLK_ERROR_STATUS command are each single bytes, such that an overhead of only two bytes has been added to the communications string. Similarly, for the de-multiplexer data in/command results out 26 extracts command results from the received string after the external modem device 150*b* has performed the command and multiplexed the results in a manner similar to the process described for the multiplexer 24. The transmit string is communicated to the computer I/O 28 which is sent to the serial controller 40 and the external modem device 150*b*. The processor unit with firmware 44 includes software structure for extracting the commands from the transmit string. Modems typically use the DLE command to momentarily put a modem in an on-line command mode. The on-line command mode maintains the data connection started while the modem was in the online data mode, however, data communication is suspended while the modem performs the requested functions. The processor unit with firmware 44 preferably permits communications to continue after receiving the DLE command.

One advantage of the modem 150 shown in FIG. 2 is that known modems may be updated to perform functions according to preferred embodiments in the present invention. The modem driver 150*a* includes software that is developed to operate in the PC. In addition, any changes required for processing commands embedded in a transmit string or for multiplexing command results in with a receive string may be provided using the flash memory and the firmware of the processor unit with firmware 44.

FIG. 3 is a block diagram of an internal modem 190 of the type that makes it advantageous use of the present invention. The internal modem 190 is described below with reference to resources, tools and standard interfaces in a Microsoft Windows NT or 9x environment. One of ordinary skill in the art will understand that alternative resources, tools and standard interfaces may be used in other computing platforms.

The internal modem 190 may be implemented on a modem card such as, a PCIMCIA, ISA, or other suitable standard bus interface card. The modem functions may be distributed between software structure implemented on the PC, and software structure or hardware components implemented on the bus interface card. The internal modem 190 may implement supervisor and data pump functions on the bus interface card. Alternatively, the internal modem 190 may be implemented as a soft modem, which implements data pump and supervisory functions using software structure in the PC. Alternatively, the supervisor and the data pump functions may be distributed between software structure in the PC and software structure in the bus interface card in any suitable manner. It is to be understood by one of ordinary skill in the art, that the internal modem 190 shown in FIG. 3 may distribute the functionality between the software structure in the PC and hardware or software structure in the bus interface card in any suitable way.

The internal modem 190 in FIG. 3 includes a communications interface 160, a command/status interface 140, and a port router 180. The communications interface 160 and the command/status interface 140 include standard interface hooks, or software connections to the standard interface 14. For example, the communications interface 160 may be configured using the Windows dial-up networking adapter service, or a suitable alternative on a different computing platform. The command/status interface 140 may include the driver interface implemented using the virtual driver interface (VxD), or any other standard driver interface. The communications interface 160 and the command/status interface 140 communicate with the port router 180. The port router 180 maps device handles or names that may be used by the standard interface 14 to the virtual ports 20, 22. Any suitable mapping system may be used, such as, registry entries and drivers.

The port router 180 communicates with a port driver 200. Specific port drivers 200 may be provided for each virtual modem port and each virtual port may be identified using a port identifier. Alternatively, tasks may be created as at the time that the port is configured and opened. In a further alternative implementation, instances of the port driver 200 may be provided as ports are created and opened.

The port driver 200 receives function calls from the port router 180 and invokes the appropriate virtual port 20, 22 to execute the command. The virtual ports 20, 22 may execute communications functions 32 or commands functions 34 according to the function received with the driver call. In a preferred embodiment, the communications functions 32 and the commands functions 34 are included in the supervisor 210. The supervisor 210 includes software and hardware structure for performing functions such as data compression, error correction, command processing, and test functions. The supervisor 210 may implement standard protocols such as V.80 and V.42. V.80 provides an interface for the H.324 ITU video conferencing standard, and the V.42 protocol provides error free transport and V.42 BIS data compression. MNP 2–4 are an alternative error free transport. Both V.42 and MNP 2–4 may use MNP-5 compression.

The supervisor 210 communicates with a data pump 136. The data pump 136 provides signal processing functions, and my implement standard protocols such as V.34 and V.90. Further information regarding the standards V.80, V.42, V.34 and V.90 may be obtained from the International Telecommunications Union (ITU). The data pump 136 communicates with the codec 138. The codec 138 communicates with the data access arrangement 142. The codec 138 and the data access arrangement 142 are well known in the art and no further discussion is therefore required.

The communication system in FIG. 4 is preferably used in an MS Windows NT or 9X (95 or 98) environment. It is to be understood by one of ordinary skill in the art that embodiments of the present invention may be used in Windows CE, OS/2, Macintosh, Unix or other computer systems.

FIG. 4 is a block diagram of an example of the communications systems in FIG. 1 using a preferred embodiment of the present invention implemented in an example of a soft modem. The block diagram in FIG. 4 shows the application 10 communicating with the standard interface 14. The standard interface 14 includes MS WIN32 services 14a and MS System services 14b. The block diagram in FIG. 4 shows software structure implemented in ring 3 and software structure implemented in ring 0. Ring 3 and ring 0 are privilege levels for the code performing the functions. Ring 3 level software structure typically includes user-level programs. Ring 0 level software structure typically includes driver level and kernel level functions. User programs typically cannot access input and output ports, and drivers typically cannot perform preemptive multitasking functions.

The MS WIN32 services module 14a performs real time operating system functions such as semaphores, timers, and task communication. The MS System services 14b in ring 0 includes services that provide the communications interface 160 and the commands/status interface 140 shown in FIG. 3. For example, in a Windows 9X environment, the MS System services 14b may include MS VCOMM, the VxD resources, the Network Driver Interface Specifications, Application Program Interfaces (API), and Network Interface Card minidriver interfaces. Information regarding these and other Microsoft Windows standard interface tools may be found in Microsoft Windows 95 Resource Kit, 1995, Microsoft Press.

An API for real time operating systems 250 provides the application with an interface for executing communications commands. During initialization, communications ports are configured with user friendly names and mapped to virtual ports using the port router 180. For example, a user may configure the modem device 190 using the Modems option in the Control Panel of Windows 95 by assigning a user-friendly name such as "Sportster" to a COMx (e.g. COM1, COM2, etc.). The port router 180 maps these names to an appropriate port driver 200 for selected virtual ports. When the "Sportster" is used to communicate a data stream, the port router 200 directs the stream and the command to the appropriate port driver 200.

In addition, a real time operating system task is created for each function available to the virtual ports. The tasks are created using the API for real time operating system 250, and when commands for performing communications functions and/or control/status request functions are performed as called for by the communications tasks (e.g. receive stream, transmit stream, etc.). In a preferred embodiment, the MSWIN32 real-time operating system resources are used as a real-time operating system. Alternatively, the IA-SPOX real time operating system may also be used.

The API for real-time operating system 250 may create tasks for implementing supervisor functions as well as other modem functions. In FIG. 4, the API for real time operating system 250 may create tasks for data terminal equipment (DTE) and call progress (CP) functions 300. Tasks may also be created for a V.42 function 302, a V.80 function 304, a fax function 306, a supervisor to voice pump interface function 308, a supervisor to data pump interface function 310, a data pump to supervisor interface function 320 and a data pump to supervisor interface plus pump function 340.

The data pump to supervisor interface function 320 communicates with a supervisor functions module 350 for performing communications and command functions with an International Standards Architecture (ISA) controller-less modem device 360. The ISA controller-less modem device 360 uses a digital signal processor, such as the TMS320BC52 Texas Instruments digital signal processor to perform data pump functions. The ISA controller-less modem device 360 communicates to hardware ports using well-known ISA bus functions.

In addition, the data pump to supervisor interface plus pump module 340 includes data pump functions for communicating with a PCI-based pumpless modem device 380. The PCI pumpless modem device 380 communicates with the data pump with supervisor interface plus pump module 340 using a memory mapped interface. The DPSI plus pump function 340 stores data for transmission in a memory space allocated to selected ports used by the PCI pumpless modem device 380. The memory is mapped to the ports according to the MAPMEM.SYS module 370.

FIG. 5 is a flowchart showing a method of establishing communications using the communications virtual port 20 of the soft modem 190 shown in FIG. 4. The application 10 used in the example illustrated by FIG. 5 is the HyperTerminal program in a Windows NT system. In addition, the diagnostic application 12 shown in FIG. 1 illustrates a method of establishing communications with a command/status port 22. The advantage of preferred embodiments of the present invention is that the method in FIG. 5 may be performed concurrently with the method in FIG. 6. The retrieval of the status information in FIG. 6 will not require any interruption in the communication string that is being processed using the method in FIG. 5.

The flowchart in FIG. 5 begins at step 400 with the invocation of the HyperTerminal application in which the application is initialized, and the communications virtual port initialization is started. The initialization of the communications virtual port begins with the loading of the port router. VxD drivers as shown in step 402. At step 404, the port router signals the ring 3 port driver for the communications virtual port that the port is being opened. The DTE test is then created at step 406, along with the SDPI task at step 408. The data pump test is created at step 410.

At step 412, the HyperTerminal application begins to establish connection. Step 412 may be carried out when the user types characters such as A T D T, or by sending the dial command along with a telephone that is to be called to establish a communications link. At step 414, the DTE task begins to run and at step 416, the call progress task is created. The data pump task begins to run at step 418 to being the negotiations for the data communications connection. At decision block 420, the data pump is checked to determine whether or not the data communications connection has been established. If it has not been established yet, the data pump task continues to attempt to connect. Decision block 420 does not show, but may provide a maximum time to wait for data pump connection. Once the data pump does connect, the data tasks are loaded at step 422. The data tasks may include a supervisor function such as those performed using V.80, V.42, or other services that may be provided. At step 424, the data communications connection continues until one of the parties initiates the steps to disconnect the connection.

FIG. 6 is a flowchart showing the use of the command/status port while communications are being carried out at the communications virtual port.

At step 430, a diagnostic application such as the dashboard application shown in FIG. 1 is initialized. One of the steps during initialization includes the initialization of the command/status port 22 (shown in FIG. 1). At step 432, the port router information is retrieved to determine the mapping of the command/status virtual port. The port router signals the second port driver at step 434. Because the second port driver is being opened to perform command/status functions, the creation and initialization of the communications and data tasks may be unnecessary. At step 436, the dashboard application waits for communication to begin at the communications virtual port 20. The communications virtual port is checked at decision block 438 to determine if it has connected yet. If it has not, the dashboard application continues to wait at step 436. Once the communications virtual port is connected, the user interface of the dashboard may be initialized at step 440. The dashboard then waits for one second at step 442. At step 444, the dashboard invokes a communications command to retrieve the speed at which the communications virtual port driver is communicating during its connection under the HyperTerminal application. When the modem speed is retrieved, it is displayed at step 446. The dashboard then goes back to wait for 1.0 seconds at step 442 before executing the GET speed command again at step 444.

The cycle of waiting for a second and retrieving the modem speed at steps 442 and 444 respectively, may be repeated until the communications virtual port connection no longer exists.

Alternative applications or functions may make other commands (such as those listed in Table 1) relating to the performance of the modem. The cycle of waiting at step 442 may be varied according to the requirements of the applications.

The advantage of using the communications virtual port for communicating a data communication connection with the HyperTerminal application is that a different application may use the command/status port to monitor its performance. It is to be understood by one of ordinary skill in the art that above examples and descriptions and are purely illustrative. Any application that makes use of a communications like with a modem and any application that retrieves diagnostic information about the modem may obtain the advantages illustrated by above described examples.

While the invention has been described in conjunction with presently preferred embodiments of the invention, persons of skill in the art will appreciate that variations may be made without departure from the scope and spirit of the invention. This true scope and spirit is defined by the appended claims, interpreted in light of the foregoing.

I claim:

1. A system for communicating with a serial communications device comprising, in combination:
   a serial device interface for communicating with an application;
   the serial device interface including a plurality of virtual ports, at least one of the virtual ports being configurable as a communications virtual port and at least one of the virtual ports being configurable, concurrently with the at least one communications virtual port, as a status virtual port;
   a serial line interface connected to a communications medium; and
   a serial communications processor for managing serial data streams between the serial line interface and the at least one communications virtual port, the serial communications processor comprising a commands processor for executing commands received at the at least one status virtual port.

2. The system of claim 1 wherein:
   the serial device interface further includes a command multiplexer for embedding commands in the serial data stream; and
   the serial communications processor being operable to separate the embedded commands from the serial data stream.

3. The system of claim 2 wherein the serial communications processor is further operable to multiplex a results string with an input data stream in response to the embedded commands.

4. The system of claim 2 further comprising:
   a data line between the multiplexer and the serial communications processor.

5. The system of claim 1 wherein the plurality of virtual ports includes a port driver for sending commands to the serial communications processor.

6. The system of claim 1 wherein the serial communications processor further comprises a supervisor and a data pump.

7. The system of claim 6 wherein the supervisor processes commands received from the virtual ports.

8. The system of claim 1 wherein the virtual port includes a port identifier, the system further comprising:
   a port router for mapping a device name to the port identifier.

9. The system of claim 1 wherein:
   the serial device interface and the serial communications processor operates in an operating environment having a first and second access privilege layers, the first access privilege layer providing a user level access and the second access privilege layer providing a driver level access.

10. The system of claim 9 wherein the virtual port includes a port identifier, the system further comprising:
    a port router for mapping a device name to the port identifier; and wherein
    the port router is implemented in the second access privilege layer.

11. The system of claim 9 wherein each of the plurality of virtual ports includes a port driver for sending commands to the serial communications processor; and wherein each port driver is implemented in the first access privilege layer.

12. The system of claim 11 further comprising:

a supervisor executing in the first access privilege layer; and a datapump executing in the second access privilege layer.

13. The system of claim 11 wherein the virtual ports communicates with a supervisor interface in the first access privilege layer.

14. The system of claim 9 wherein the operating environment includes a Windows operating system, the first access privilege layer includes a Ring 3 and the second access privilege layer includes a Ring 0.

15. A method for communicating with a serial communications device connected to a serial interface line comprising the steps of:

initiating a communications connection by opening a first virtual port in the serial communications device and connecting the first virtual port to a destination station over the serial interface line;

using the first virtual port for communicating a data stream between the serial communications device and the destination station;

opening a second virtual port in the serial communications device;

sending commands to the second virtual port; and processing the commands, such that the commands are processed without an interruption in the communication of the data stream at the first virtual port.

16. The method of claim 15 further comprising the step of:

mapping a device name to a port name corresponding to each said first and second virtual ports in a port router; and using the device name for the first virtual port to open the first virtual port.

17. The method of claim 16 wherein the step of opening the first virtual port further comprises the steps of:

retrieving the port name for the device name from the port router.

18. The method of claim 15 wherein the step of opening the first virtual port further comprises the steps of:

assigning a port driver to the first virtual port.

19. The method of claim 15 wherein the step of opening the first virtual port further comprises the steps of:

creating a DTE task for performing data telephone equipment functions.

20. The method of claim 15 wherein the step of opening the first virtual port further comprises the steps of:

creating a call progress task for monitoring the call progress.

21. The method of claim 15 wherein the step of opening the first virtual port further comprises the steps of:

creating tasks for providing an interface between a supervisor and a data pump.

22. The method of claim 15 wherein the step of opening the first virtual port further comprises the steps of:

creating data tasks for performing supervisor functions.

23. The method of claim 15 wherein the step of opening the first virtual port further comprises the steps of:

creating a data task for performing V.42 error correction.

24. The method of claim 15 wherein the step of opening the first virtual port further comprises the steps of:

creating a data task for performing V.80 communications functions.

25. The method of claim 15 wherein the step of opening the first virtual port further comprises the steps of:

creating a data task for performing fax functions.

26. The method of claim 15 wherein the step of processing commands comprises the steps of:

embedding at least one command in the transmit stream to form an embedded command stream;

sending the transmit stream with embedded command stream to a command processor; and the command processor extracting the embedded command stream from the transmit stream.

27. The method of claim 26 further comprising the steps of:

embedding a command signal in a transmit stream; wherein:

the step of embedding the command in the transmit stream includes the step of placing the command after the command signal.

28. The method of claim 26 further comprising the steps of:

processing the embedded command stream; and if the embedded command has at least one command result, embedding the command results in a receive stream.

29. The method of claim 15 further comprising the steps of:

sending a communications speed request to the second virtual port;

receiving the communications speed; and sending the communications speed to a user interface.

30. The method of claim 15 further comprising the steps of:

waiting for a period of time after the step of sending the communication speed; and repeating the steps of sending the communications speed request, receiving the communications speed and sending the communications speed.

* * * * *